(12) United States Patent
Deng et al.

(10) Patent No.: US 12,320,659 B2
(45) Date of Patent: Jun. 3, 2025

(54) PATH DETERMINATION METHOD AND APPARATUS, DEVICE, AND MEDIUM

(71) Applicant: BYD COMPANY LIMITED, Shenzhen (CN)

(72) Inventors: Linwang Deng, Shenzhen (CN); Guanhao Du, Shenzhen (CN); Tianyu Feng, Shenzhen (CN); Sijia Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 211 days.

(21) Appl. No.: 18/154,564

(22) Filed: Jan. 13, 2023

(65) Prior Publication Data

US 2023/0168097 A1    Jun. 1, 2023

Related U.S. Application Data

(63) Continuation of application No. PCT/CN2021/108689, filed on Jul. 27, 2021.

(30) Foreign Application Priority Data

Jul. 28, 2020  (CN) .......................... 202010742850.4

(51) Int. Cl.
 *G01C 21/34* (2006.01)
 *G01C 21/36* (2006.01)

(52) U.S. Cl.
 CPC ..... *G01C 21/3469* (2013.01); *G01C 21/3461* (2013.01); *G01C 21/3492* (2013.01); *G01C 21/3682* (2013.01)

(58) Field of Classification Search
 CPC .................................................. G01C 21/3469
 See application file for complete search history.

(56) References Cited

U.S. PATENT DOCUMENTS

| 8,942,919 B2 | 1/2015 | Uyeki et al. |
| 2010/0057339 A1 | 3/2010 | Pryakhin et al. |
| (Continued) | | |

FOREIGN PATENT DOCUMENTS

| CN | 101645200 A | 2/2010 |
| CN | 103791961 A | 5/2014 |
| (Continued) | | |

OTHER PUBLICATIONS

The World Intellectual Property Organization (WIPO) International Search Report for PCT/CN2021/108689 Oct. 29, 2021 8 pages (with translation).

*Primary Examiner* — Long T Tran

(74) *Attorney, Agent, or Firm* — Wenye Tan

(57) ABSTRACT

A path determination method includes: obtaining current position information and destination position information of a target vehicle; determining a candidate path of the target vehicle according to the current position information and the destination position information; acquiring road condition information of the candidate path and reference vehicle information; determining first energy consumption information required to be consumed by the target vehicle to travel on the candidate path over a unit distance according to the road condition information and the reference vehicle information; and recommending the candidate path to the target vehicle according to the first energy consumption information.

20 Claims, 5 Drawing Sheets

(56) References Cited

U.S. PATENT DOCUMENTS

| | | |
|---|---|---|
| 2010/0076675 A1 | 3/2010 | Barth et al. |
| 2011/0238457 A1* | 9/2011 | Mason ............ G06Q 10/063112 |
| | | 705/7.14 |
| 2011/0279255 A1 | 11/2011 | Miyoshi |
| 2011/0307166 A1* | 12/2011 | Hiestermann ...... G01C 21/3492 |
| | | 701/119 |
| 2014/0019041 A1* | 1/2014 | Kluge ................ G01C 21/3469 |
| | | 701/527 |
| 2015/0329102 A1* | 11/2015 | Yoshikawa ........... B60W 10/06 |
| | | 701/1 |
| 2018/0058868 A1* | 3/2018 | Kang .................... B60W 20/12 |
| 2019/0063937 A1* | 2/2019 | Moore .................... B60L 50/50 |
| 2021/0012584 A1* | 1/2021 | Saavedra Román .. G06N 5/046 |
| 2021/0287459 A1* | 9/2021 | Cella .................... G07C 5/0808 |
| 2022/0001754 A1* | 1/2022 | Lu ........................... B60L 53/68 |

FOREIGN PATENT DOCUMENTS

| | | |
|---|---|---|
| CN | 103900598 A | 7/2014 |
| CN | 102884401 B | 11/2015 |
| CN | 107818377 A | 3/2018 |
| CN | 108106626 A | 6/2018 |
| CN | 108489500 A | 9/2018 |
| CN | 109141455 A | 1/2019 |
| CN | 109269519 A | 1/2019 |
| CN | 109827588 A | 5/2019 |
| CN | 110375757 A | 10/2019 |
| CN | 110660214 A | 1/2020 |
| CN | 110736473 A | 1/2020 |
| CN | 110901648 A | 3/2020 |
| CN | 109835207 B | 9/2020 |
| CN | 109747427 B | 2/2021 |
| JP | 2005128808 A | 5/2005 |
| JP | 2011033447 A | 2/2011 |
| JP | 2014066655 A | 4/2014 |
| JP | 2014197020 A | 10/2014 |

* cited by examiner

PATH DETERMINATION METHOD AND APPARATUS, DEVICE, AND MEDIUM

CROSS-REFERENCE TO RELATED APPLICATIONS

The present application is a continuation application of PCT application No. PCT/CN2021/108689 filed on Jul. 27, 2021, which is based on and claims priority to Chinese Patent Application No. 202010742850.4 filed on Jul. 28, 2020, content of all of which is incorporated herein by reference in its entirety.

FIELD

The present disclosure relates to the field of vehicles and in particular, to a path determination method and apparatus, a device, and a medium.

BACKGROUND

As the number of traffic roads increases, the road conditions become more and more complex. As a result, the vehicle navigation system is widely used in the process of vehicle driving for, for example, planning the route for vehicle driving. In related art, the path is planned for the vehicle according to the path length, the path congestion rate or the road conditions and other information. Although the congested path can be avoided during the driving process, the vehicle is prone to the problem of failure to drive to the destination due to insufficient energy, thus reducing the driving efficiency of the vehicle.

SUMMARY

Embodiments of the present disclosure provides a path determination method and apparatus, a device and, a medium, to avoid the problem of insufficient energy consumption during the driving process, thus improving the driving efficiency of the vehicle.

In an aspect, an embodiment of the present disclosure provides a path determination method. The method includes: obtaining current position information and destination position information of a target vehicle; determining a candidate path of the target vehicle according to the current position information and the destination position information; acquiring road condition information of the candidate path and reference vehicle information; determining first energy consumption information required to be consumed by the target vehicle to travel on the candidate path over a unit distance according to the road condition information and the reference vehicle information; and recommending the candidate path to the target vehicle according to the first energy consumption information.

In another aspect, the present disclosure provides a computer device. The computer device includes a memory configured to store a program code; a network interface configured to provide a data communication function; and a processor connected to the memory and the network interface. The processor is configured to execute the program code to perform: obtaining current position information and destination position information of a target vehicle; determining a candidate path of the target vehicle according to the current position information and the destination position information; acquiring road condition information of the candidate path and reference vehicle information; determining first energy consumption information required to be consumed by the target vehicle to travel on the candidate path over a unit distance according to the road condition information and the reference vehicle information; and recommending the candidate path to the target vehicle according to the first energy consumption information.

In another aspect, an embodiment of the present disclosure provides a computer readable storage medium storing computer program instructions executable by a processor to perform: obtaining current position information and destination position information of a target vehicle; determining a candidate path of the target vehicle according to the current position information and the destination position information; acquiring road condition information of the candidate path and reference vehicle information; determining first energy consumption information required to be consumed by the target vehicle to travel on the candidate path over a unit distance according to the road condition information and the reference vehicle information; and recommending the candidate path to the target vehicle according to the first energy consumption information.

According to the embodiments of the present disclosure, current position information and destination position information of a target vehicle are obtained; a candidate path of the target vehicle is determined according to the current position information and the destination position information; road condition information of the candidate path and reference vehicle information are acquired; first energy consumption information required to be consumed by the target vehicle to travel on the candidate path over a unit distance is determined according to the road condition information and reference vehicle information; and the candidate path is recommended to the target vehicle according to the first energy consumption information. Here, the reference vehicle information is determined according to the energy consumption information required to be consumed when at least one reference vehicle travels on the candidate path over a unit distance in a historical period of time (that is, a time period before recommending the candidate path to the target vehicle). Since the energy consumption information is obtained in the practical travel process of the reference vehicle, the energy consumption information can accurately reflect the energy consumption value required by a vehicle travelling on the candidate path. By determining the energy consumption value corresponding to each candidate path, it is convenient for users to make a reasonable choice, to avoid the problem of insufficient energy consumption during the driving process of the vehicle, so as to optimize the recommended driving path for the vehicle and improve the driving efficiency of the vehicle.

BRIEF DESCRIPTION OF THE DRAWINGS

To describe the technical solutions in the present disclosure more clearly, the accompanying drawings for describing certain embodiments of the present disclosure will be described briefly below. Apparently, the accompanying drawings described below show only some embodiments of the present disclosure, and other drawings can be obtained by a person of ordinary skill in the art based on these accompanying drawings without creative efforts.

DETAILED DESCRIPTION

The technical solutions in embodiments of the present disclosure are described below with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
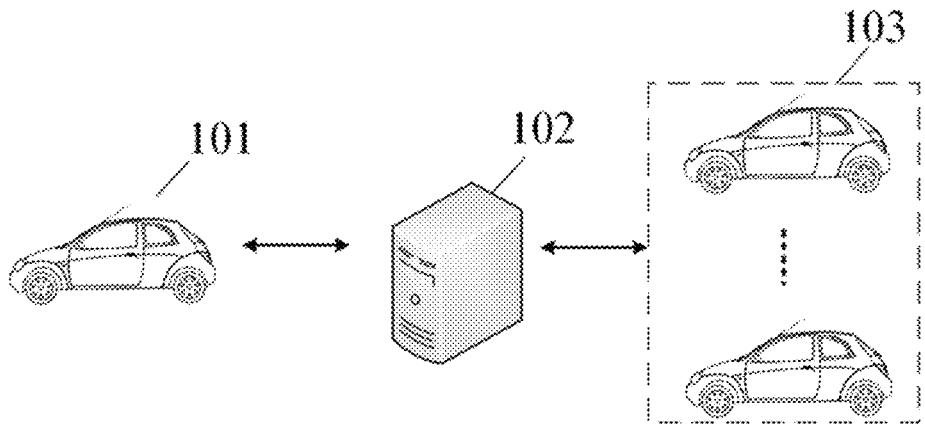
FIG. 1 is a schematic diagram showing the architecture of a path determination system provided in an embodiment of the present disclosure.

The technical solutions of the present disclosure are applicable to a scenario where a candidate path is planned for a vehicle. FIG. 1 is a schematic diagram showing the architecture of a path determination system provided in an embodiment of the present disclosure. The architecture of the system schematically shown includes a target vehicle 101, an on-board server 102 and a reference vehicle 103. The target vehicle 101 is a vehicle for which a path needs to be planed, the on-board server 102 may be a backend server of the vehicle control center, and the reference vehicle 103 may be a vehicle driving through the path to be planned for the target vehicle 101, including, for example, vehicles driving through one or more road sections of the path to be planned. The target vehicle 101 can be configured to send vehicle information of the target vehicle 101 to the on-board server 102. For example, the vehicle information may include current position information, destination position information, and remaining energy value of the vehicle, and so on. The on-board server 102 can be configured to receive the vehicle information sent from the target vehicle 101 and reference vehicle information sent from the reference vehicle 103, process the vehicle information sent from the target vehicle 101 and the reference vehicle information sent from the reference vehicle 103 to obtain first energy consumption information required to be consumed by the target vehicle to travel on the candidate path over a unit distance, and recommend the candidate path to the target vehicle 101. The reference vehicle 103 can be configured to send the reference vehicle information to the on-board server 102. The number of the target vehicle 101 may be one or multiple, and description is made in the embodiments of the present disclosure by way of examples where the number of the target vehicle 101 is one. If the number of the target vehicle 101 is multiple, the path determination method for other target vehicles 101 can be made reference to the path determination method for the target vehicle. The on-board server 102 may be an independent server or a server cluster consisting of multiple servers. The number of the reference vehicle 103 may be one or multiple, and description is made in the present disclosure by way of examples where the number of the reference vehicle 103 is multiple.

The target vehicle 101 and the reference vehicle 103 can be, for example, large trucks, small cars and other vehicles equipped with on-board terminals. For example, the on-board terminal can include mobile phones, tablet computers, laptop computers, handheld computers, smart audio devices, on-board iPad, mobile internet devices (MID), and wearable devices (such as smart watch, and smart bracelet), etc.; The on-board server 102 may be an independent server, a server cluster consisting of several servers, or a cloud computing center, etc.

Further, as shown in FIG. 1, during the implementation of the path determination method, for example, the target vehicle 101 sends current position information and destination position information of the target vehicle 101 to the on-board server 102; the on-board server 102 determines a candidate path for the target vehicle 101 according to the current position information and the destination position information of the target vehicle 101; the reference vehicle 103 sends reference vehicle information corresponding to the reference vehicle 103 travelling on the candidate path to the on-board server 102; the on-board server 102 acquires road condition information of the candidate path and the reference vehicle information corresponding to the reference vehicle 103 travelling on the candidate path; the on-board server 102 determines first energy consumption information required to be consumed by the target vehicle to travel on the candidate path over a unit distance according to the road condition information and the reference vehicle information; and the on-board server 102 recommends the candidate path to the target vehicle 101 according to the first energy consumption information. The first energy consumption information required to be consumed by the target vehicle to travel on the candidate path over a unit distance is determined according to the reference vehicle information corresponding to the reference vehicle travelling on the candidate path. That is, the first energy consumption information is determined according to the practical driving conditions of the reference vehicle. Therefore, the first energy consumption information is more accurate and the candidate path recommended to the target vehicle according to the first energy consumption information is more accurate. This is convenient for users to make a reasonable choice, to avoid the problem of insufficient energy consumption during the driving process of the vehicle, so as to improve the driving efficiency of the vehicle.

Figure 2:
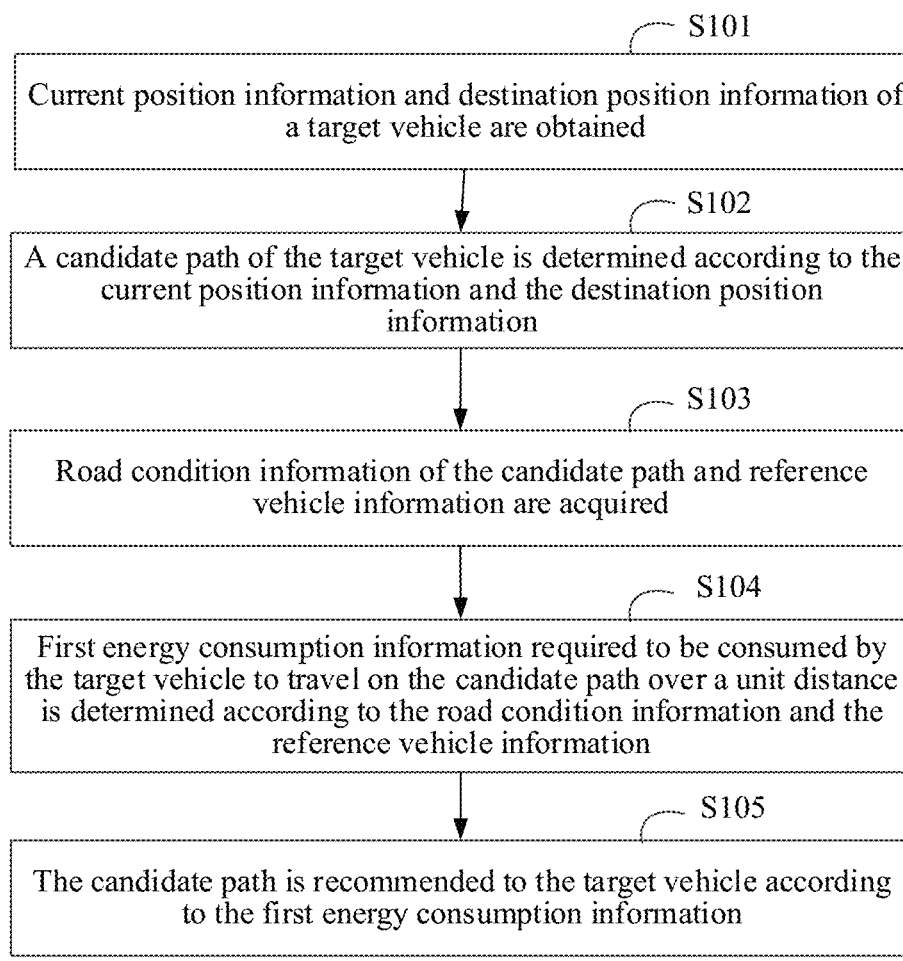
FIG. 2 is a schematic flowchart of a path determination method provided in an embodiment of the present disclosure.

FIG. 2 is a schematic flowchart of a path determination method provided in an embodiment of the present disclosure. As shown in FIG. 2, the method includes:

S101: Current position information and destination position information of a target vehicle are obtained.

Here, the target vehicle is a vehicle for which a path needs to be planed. The current position information and the destination position information of the target vehicle may be, for example, specific place names. The target vehicle can upload the current position information and the destination position information of the target vehicle to the on-board server in real time, to facilitate the on-board server to adjust the candidate path according to the current position information and the destination position information of the target vehicle, thus improving the accuracy of path determination. Optionally, if multiple pieces of destination position information sent from the target vehicle are received, multiple candidate paths including the multiple pieces of destination position information can be planned for the target vehicle. Optionally, when the current position information and the destination position information of the target vehicle are obtained, current time information may also be obtained.

S102: A candidate path of the target vehicle is determined according to the current position information and the destination position information.

Figure 3:
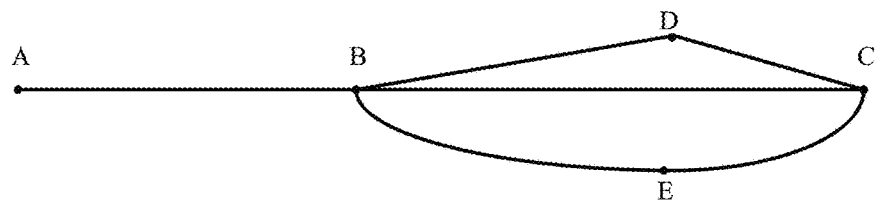
FIG. 3 is a schematic diagram of a candidate path provided in an embodiment of the present disclosure.

Here, multiple candidate paths can be included between the current position information and the destination position information. FIG. 3 is a schematic diagram of a candidate path provided in an embodiment of the present disclosure. For example, the target vehicle will travel from a current position A to a destination position C. 3 candidate paths from the current position A to the destination position C can be planned according to the road conditions or path lengths and other factors. A first candidate path can be A-B-D-C, a second candidate path can be A-B-C, and a third candidate path can be A-B-E-C.

S103: Road condition information of the candidate path and reference vehicle information are acquired.

Here, the reference vehicle information is corresponding information of the reference vehicle travelling on the candidate path. The candidate path includes at least one road section, as shown in FIG. 3. For example, the candidate path A-B-D-C includes three road sections AB, BD and DC, respectively. The road condition information of the candidate path includes road condition information of each road section in the at least one road section. The road condition information of each road section includes at least one of the road section type of each road section, the congestion rate of each road section, the length of each road section, and the number of traffic indicators in each road section. For example, the road section type can be divided according to the limited vehicle speed on the road section, such as highway, expressway, ordinary highway, and rural road, etc. The road section type can also be divided according to the type of construction materials of the road section, such as asphalt road, cement road, mud road and so on. The road section type can also be divided according to the flatness and gentleness of the road section, such as flat and gentle road section, steep road section, curved road section, and so on. The congestion rate of the road section is used to indicate the degree of congestion in the road section. That is, the larger the congestion rate is, the more congested the traffic in the road section will be; and the smaller the congestion rate is, the less congested the traffic in the road section will be. The traffic indicator may include, for example, traffic lights, and electronic cameras, etc.

The reference vehicle is a vehicle that has completed driving on the candidate road section before the target vehicle travels on the candidate road section, and has uploaded its own reference vehicle information to the on-board server. The reference vehicle information includes the power consumption parameter information of the reference vehicle driving on each road section and type of the reference vehicle. Here, second energy consumption information of the reference vehicle refers to the energy consumption index of the reference vehicle, for example, the power consumption index configured when the reference vehicle leaves the factory, for example, 150 watt-hours per kilometer (unit: wh/km), that is, the power consumption is 150 wh per kilometer. Alternatively, it can also refer to the fuel consumption index configured when the vehicle leaves the factory, and so on. The type of the reference vehicle can include the vehicle type, such as truck, car, and trailer, or seat type of the vehicle, such as large 2-seat truck, small 2-seat truck, 5-seat car, 2-seat car, and so on. Optionally, the reference vehicle information may further include an identifier used to uniquely identify the vehicle, such as the registration number of the vehicle, the factory serial number of the vehicle and the vehicle identification number. In addition, the reference vehicle information includes reference time information of the reference vehicle travelling on each road section of the candidate path.

Optionally, the reference vehicle can upload the reference vehicle information shown in Table 1 to the on-board server.

TABLE 1

| Reference vehicle information (exemplary) | | | | | | |
|---|---|---|---|---|---|---|
| S | $T_s$ | $T_e$ | $E_c$ | $E_{rs}$ | $E_{re}$ | type |
| S1 | $T_{1s}$ | $T_{1e}$ | $E_{c1}$ | $E_{1rs}$ | $E_{1re}$ | type 1 |
| S2 | $T_{2s}$ | $T_{2e}$ | $E_{c2}$ | $E_{2rs}$ | $E_{2re}$ | type 2 |
| ... | ... | ... | ... | ... | ... | ... |
| Sn | $T_{ns}$ | $T_{ne}$ | $E_{cn}$ | $E_{nrs}$ | $E_{nre}$ | type n |

In Table 1, S is the unit distance, Ts is the starting time of the reference vehicle travelling in the unit distance S, Te is the end time of the reference vehicle travelling in the unit distance S, Ec is the total energy consumption value of the reference vehicle travelling in the unit distance S, Ers is the remaining energy at the start of the reference vehicle travelling in the unit distance S, Ere is the remaining energy at the end of the reference vehicle travelling in the unit distance S, and type is the vehicle type of the reference vehicle. Optionally, the reference vehicle may also upload information such as the current speed of the vehicle.

S104: First energy consumption information required to be consumed by the target vehicle to travel on the candidate path over a unit distance is determined according to the road condition information and the reference vehicle information.

The first energy consumption information required to be consumed by the target vehicle to travel on the candidate path over a unit distance includes energy consumption values required to be consumed by the target vehicle to travel on the candidate path over every unit distance. For example, the candidate path includes a path of 3 unit distances. That is, the candidate path is 30 m, and the unit distance is 10 m, so the candidate path includes a path of 3 unit distances. As such, the first energy consumption information includes energy consumption values required to be consumed by the target vehicle to travel over each unit distance of the 3 unit distances. Alternatively, the first energy consumption information required to be consumed by the target vehicle to travel on the candidate path includes the energy consumption value required to be consumed by the target vehicle to travel over every unit distance of each road section. For example, the candidate path includes 3 road sections. As such, the first energy consumption information includes energy consumption values required to be consumed by the target vehicle to travel over every unit distance in each road section of the 3 road sections. Here, due to different road condition information and reference vehicle information, the energy consumed may be different when the vehicle travels on the candidate path at various locations, when different types of vehicles travels on the same path over the same distance, and when the same vehicle travels on different paths over the same distance. Therefore, the first energy consumption information required to be consumed by the target vehicle to travel on the candidate path over a unit distance can be determined according to the road condition information and reference vehicle information. Optionally, the corresponding energy variation of the vehicle travelling on the candidate path, for example, the difference between Ere and Ers in Table 1, can also be directly obtained, to determine the first energy consumption information required to be consumed by the target vehicle to travel on the candidate path over a unit distance.

Since the current time information is obtained when the current position information and destination position information of the target vehicle are obtained and each piece of reference time information of the reference vehicle travelling on the road section is obtained when the reference vehicle information of the reference vehicle is obtained, reference time information matching the current time information can be determined from multiple pieces of reference time information corresponding to the reference vehicle. In this way, the first energy consumption information required to be consumed by the target vehicle to travel on the candidate path over a unit distance is determined according to the energy consumption information consumed by the reference vehicle when travelling on the candidate road section over a unit distance within the reference time information.

Here, the reference time information that matches the current time information, for example, can be the same time point before the current time and within a preset period of time; or a time point before the current time and having a difference from the same time point within a preset period of time that meets a time threshold, and so on. Then the reference vehicle is a vehicle that travels on the candidate path in the reference time information that matches the current time information.

For example, if the current time is 18:00 on Jun. 18, 2020 (Thursday), the preset period of time is one day, and the time threshold is 30 min, the reference time information that matches the current time information can be, for example, 18:00 on Jun. 17, 2020 (Wednesday) or 17:30-18:00 on Jun. 17, 2020 (Wednesday). If the preset period of time is one week and the time threshold is 30 min, the reference time information that matches the current time information can be, for example, 18:00 on Jun. 15, 2020 (Monday), 18:00 on Jun. 16, 2020 (Tuesday), 18:00 on Jun. 17, 2020 (Wednesday), 17:30-18:00 on Jun. 15, 2020 (Monday), 17:30-18:00 on Jun. 16, 2020 (Tuesday), and 17:30-18:00 on Jun. 17, 2020 (Wednesday).

In an embodiment of the present disclosure, the first energy consumption information required to be consumed by the target vehicle to travel on the candidate path over a unit distance can be determined through the following process:

I. Second energy consumption value of the reference vehicle on each road section over a unit distance is determined according to the road condition information of the road section and second energy consumption information of the reference vehicle travelling on the road section.

Here, the road section refers to any road section of the at least one road section included in the candidate path, and the processing is directed to any road section. Other road sections in the at least one road section included in the candidate path can be processed following this procedure. It can be seen that the second energy consumption value is the energy consumption value when the reference vehicle travels on each road section over unit distance within the reference time. If the reference vehicle travels on the same road section in several different time periods, the corresponding energy consumption value may be different. Due to the different time periods when the reference vehicle travels on the road section, the congestion rate of the road section may be different, resulting in that the second energy consumption value consumed is different when the same vehicle travels on the same road section. In the embodiment of the present disclosure, the reference time that matches the current time of the target vehicle is obtained to determine the second energy consumption value of the reference vehicle when travelling on the road section in the reference time. This avoids different first energy consumption information required to be consumed by the target vehicle to travel on the candidate path over a unit distance determined in different time periods.

Here, for example, if the road section is a flat and gentle road section, the second energy consumption value of the reference vehicle when travelling on the smooth road section over a unit distance is smaller than the second energy consumption value of the reference vehicle when travelling on a steep road section over a unit distance, and the second energy consumption value of the reference vehicle when travelling on an asphalt road over a unit distance is less than the second energy consumption value of the reference vehicle when travelling on a mud road over a unit distance, and so on. Therefore, the second energy consumption value of the reference vehicle when travelling on each road section over a unit distance can be determined according to specific road condition information and second energy consumption information of the reference vehicle.

In a specific implementation, the total energy consumption value of the reference vehicle on each road section can be determined according to the road condition information of each road section and the second energy consumption information of the reference vehicle when travelling on each road section. The second energy consumption value of the reference vehicle when travelling on each road section over a unit distance is obtained according to a ratio of the total energy consumption to the length of each road section.

In a possible implementation, when the reference vehicle travels on the road section, the reference vehicle sends the current position information and remaining energy value to the on-board server in real time, and the on-board server calculate the total energy consumption value of the reference vehicle on each road section according to the position information of the reference vehicle and the remaining energy value of the reference vehicle. The second energy consumption value of the reference vehicle when travelling on each road section over a unit distance is obtained according to a ratio of the total energy consumption to the length of each road section. For example, the second energy consumption value of the reference vehicle when travelling on each road section over a unit distance can be calculated by Formula (1-1)

$$P = \frac{\int_{t=0}^{t=T} E_c dt}{S} \tag{1-1}$$

where taking road section 1 as an example, P is the second energy consumption value of the reference vehicle when travelling on the road section 1 over a unit distance, S is the length of the road section 1, $E_c$ is the total energy consumption of the reference vehicle on the road section 1, and T is the total time spent by the reference vehicle when travelling on the road section 1.

II. An energy consumption weight of the reference vehicle is determined according to the type of the reference vehicle.

Here, the energy consumption relationship between the reference vehicle and a standard vehicle is obtained first, and the energy consumption weight of the reference vehicle is determined according to the energy consumption relationship. For example, if the standard vehicle is a 2-seat vehicle, the reference vehicle a1 is a 5-seat vehicle, the reference vehicle a2 is a 7-seat vehicle, and the energy consumption relationship of the standard vehicle with the reference vehicle a1 is 1:2 and 1:3, then the corresponding energy consumption weights of the reference vehicles may be 1/2 and 1/3 respectively.

III. The second energy consumption value is normalized using the energy consumption weight, to obtain a third energy consumption value corresponding to the road section.

Here, the third energy consumption value corresponding to the road section is the energy consumption value of the reference vehicle when travelling on the road section over a unit distance. The third energy consumption value of the reference vehicle when travelling on the road section over a unit distance can be calculated by Formula (1-2):

$$P_{nominal} = k_n P_n \quad (1\text{-}2)$$

where n is the road section, $P_{nominal}$ is third energy consumption value of the reference vehicle when travelling on the road section over a unit distance, $k_n$ is energy consumption weight of the reference vehicle, and the $P_n$ is the second energy consumption value of the reference vehicle when travelling on the road section over a unit distance. In the above process, the processing is directed to the situation where only one reference vehicle travels on each road section. If there are multiple reference vehicles on each road section, other reference vehicles can be processed following the processing method for this reference vehicle, to obtain the corresponding third energy consumption value of each reference vehicle.

IV. The first energy consumption value is determined according to the third energy consumption value.

Here, the first energy consumption value refers to the energy consumption value required to be consumed by the target vehicle to travel on the road section over a unit distance.

In a possible implementation, if there is only one reference vehicle on each road section, the third energy consumption value corresponding to the reference vehicle is determined as the first energy consumption value.

In another possible implementation, if there are multiple reference vehicles on each road section, the average value of the third energy consumption values corresponding to the multiple reference vehicles on the road section is calculated, and the average value is determined as the first energy consumption value. Here, one reference vehicle corresponds to one third energy consumption value. For example, the average value of the third energy consumption values corresponding to the multiple reference vehicles on each road section can be calculated according to Formula (1-3):

$$\overline{P}(tn) = \text{mean}(\Sigma P(tn, Lm)) \quad (1\text{-}3)$$

where, m is the road section, tn is the reference time, $\overline{P}(tn)$ and is the average value of the third energy consumption values corresponding to multiple reference vehicles on the road section m within the reference time. It can be known that one reference vehicle corresponds to one third energy consumption value within one reference time, so one reference time corresponds to one average value of the third energy consumption of the reference vehicle. That is, one reference time corresponds to one first energy consumption value required to be consumed by the target vehicle to travel on each road section over a unit distance.

For example, the reference vehicle travels on the road section in three reference times T1-T3. Then the third energy consumption values of the reference vehicle corresponding to the three reference times T1-T3 are x1, x2 and x3 respectively. The reference time matching the current time of the target vehicle is T2, so the third energy consumption value x2 corresponding to T2 is determined as the energy consumption required to be consumed by the target vehicle to travel on the road section over a unit distance.

It is to be understood that for each road section included in the candidate path, the above method can be used to calculate the first energy consumption value required to be consumed by the target vehicle to travel on each road section over a unit distance. Thus, the average values of multiple road sections corresponding to the candidate path can be calculated to obtain the average energy consumption of each candidate path. Alternatively, the sum of the energy consumption values of multiple road sections corresponding to the candidate path is calculated to obtain the total energy consumption of each candidate path.

S105: The candidate path is recommended to the target vehicle according to the first energy consumption information.

Here, the first energy consumption information refers to the energy consumption information required to be consumed by the target vehicle to travel on the candidate path over a unit distance. According to the first energy consumption information, the total energy consumption value required to be consumed by the target vehicle to travel on the candidate path over every unit distance is determined. The candidate path is recommended to the target vehicle according to the total energy consumption value required to be consumed by the target vehicle to travel on the candidate path over every unit distance. Alternatively, the average energy consumption value required to be consumed by the target vehicle to travel on the candidate path over every unit distance can be determined according to the first energy consumption information, and the candidate path is recommended to the target vehicle according to the average energy consumption value. Alternatively, the candidate path can be recommended to the target vehicle according to the total energy consumption information and road condition information of each candidate path. Alternatively, the candidate path can be recommended to the target vehicle according to the energy consumption information of each candidate path and the total driving time required by the vehicle to travel on each candidate path.

For example, the candidate path with the minimum total energy consumption required to be consumed by the target vehicle to travel on the candidate path can be determined as the target candidate path, and the target candidate path is recommended to the target vehicle. Alternatively, the candidate path is recommended to the target vehicle according to at least one of the total driving time of the vehicle when travelling on each candidate path, the road section type of each road section in each candidate path, the congestion rate of each candidate path, the number of traffic indicators in each candidate path, and other parameters, in combination with the energy consumption information of the candidate path. For example, the candidate path with the minimum energy consumption and the shortest driving time, the candidate path with the minimum energy consumption and the best road section type (i.e. including more smooth road sections, less steep road sections and curved road sections), the candidate path with the minimum energy consumption and lowest congestion rate, or candidate path with the minimum energy consumption and the least number of traffic indicators, and so on is recommended to the target vehicle.

In a possible implementation, the energy consumption map of multiple time points corresponding to the road section can be, for example, as shown in the following matrix (1-4), in which tn is the time point, Lm is the road section, P(tn, Lm) is the third energy consumption value required to be consumed by the reference vehicle travelling at time point tn on the road sectionLm over a unit distance:

$$\begin{bmatrix} P(t1, L1) & \ldots & P(t1, Lm) \\ \vdots & \ddots & \vdots \\ P(tn, L1) & \ldots & P(tn, Lm) \end{bmatrix} \quad (1-4)$$

In a possible implementation, the travel map corresponding to the target vehicle is obtained first; then the candidate path and the first energy consumption information are marked on the travel map to obtain an energy consumption map; and finally, the candidate path is recommended to the target vehicle according to the energy consumption map.

Here, the travel map includes the current position information and destination position information of the target vehicle, and multiple candidate paths. In a specific implementation, the corresponding first energy consumption value of each road section in each candidate path can be obtained. The first energy consumption value of each road section is marked on the travel map to obtain the first energy consumption information of each candidate path.

Optionally, multiple first energy consumption values can be divided according to the range of energy consumption values to obtain multiple energy consumption levels, such as extremely high energy consumption A+ (greater than 500 wh/km), extremely high energy consumption A (500 wh/km-450 Wh/km), extremely high energy consumption B (450 wh/km-400 Wh/km), high energy consumption A (400 wh/km-350 Wh/km), high energy consumption B (350 wh/km-300 Wh/km), normal energy consumption (300 wh/km-150 Wh/km), and low energy consumption (less than 150 wh/km), which can be marked on the travel map with different colors to display the corresponding energy consumption level of each road section in the candidate path. For example, the corresponding energy consumption level may be extremely high energy consumption A+ when the vehicle travels on a steep road section, a mud road and a road section with a high congestion rate; and the corresponding energy consumption level may be low energy consumption when the vehicle travels on a smooth road section (such as highways), a road section with low congestion rate, and so on.

Figure 4:
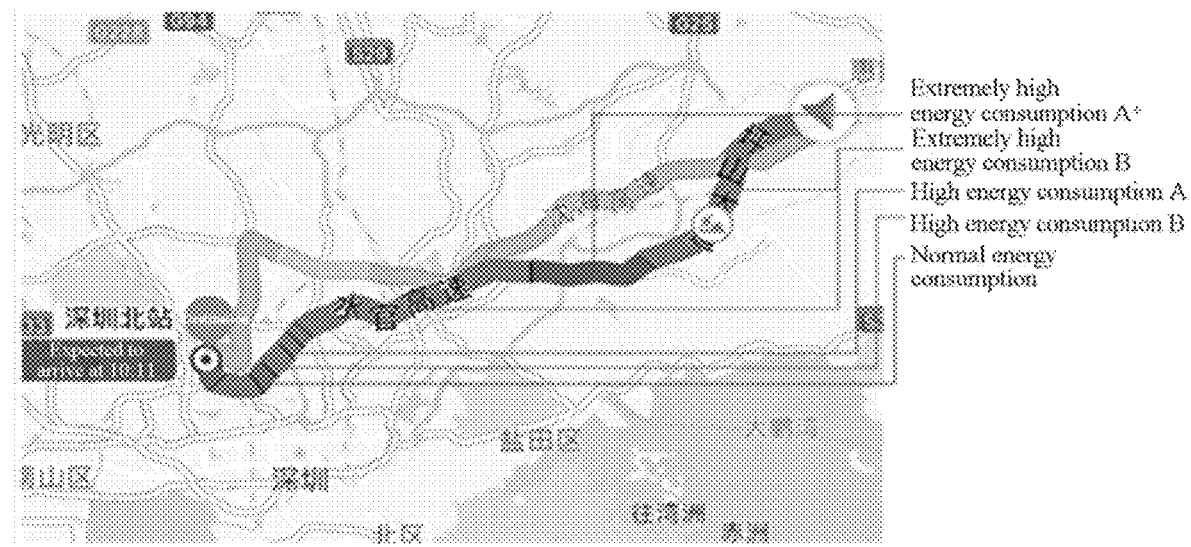
FIG. 4 is a schematic diagram of an energy consumption map provided in an embodiment of the present disclosure.

For example, the energy consumption map can be as shown in FIG. 4. FIG. 4 is a schematic diagram of an energy consumption map provided in an embodiment of the present disclosure. In FIG. 4, the current position information and destination position information of the target vehicle, multiple candidate paths, and the energy consumption level corresponding to each road section in each candidate path are included.

Optionally, the average energy consumption of each candidate path may be marked on the travel map. Alternatively, the total energy consumption of each candidate path is marked on the travel map. It can be understood that since the corresponding energy consumption value over unit distance of each road section in the candidate path is calculated, the reference time and the energy consumption value over unit distance of the road section can be stored in correspondence. Since the information of the reference vehicle is updated in real time, the energy consumption value over unit distance of the road section will be updated according to the reference vehicle information of the reference vehicle.

Optionally, the target vehicle travels down the candidate path, and the vehicle information of the target vehicle is uploaded in real time. After the target vehicle travels over the candidate path, the target vehicle can be used as a reference vehicle, and the vehicle information of the target vehicle can be used as the reference vehicle information of the reference vehicle. Thus, the energy consumption value over unit distance of the road section is updated according to the above method, so as to recommend the candidate path to subsequent vehicles.

Here, if there is one candidate path, the candidate path can be recommended to the target vehicle according to the candidate path and the total energy consumption value required to be consumed by the target vehicle to travel on the candidate path or the average first energy consumption value required to be consumed by the target vehicle to travel on the candidate path over a unit distance.

Figure 5:
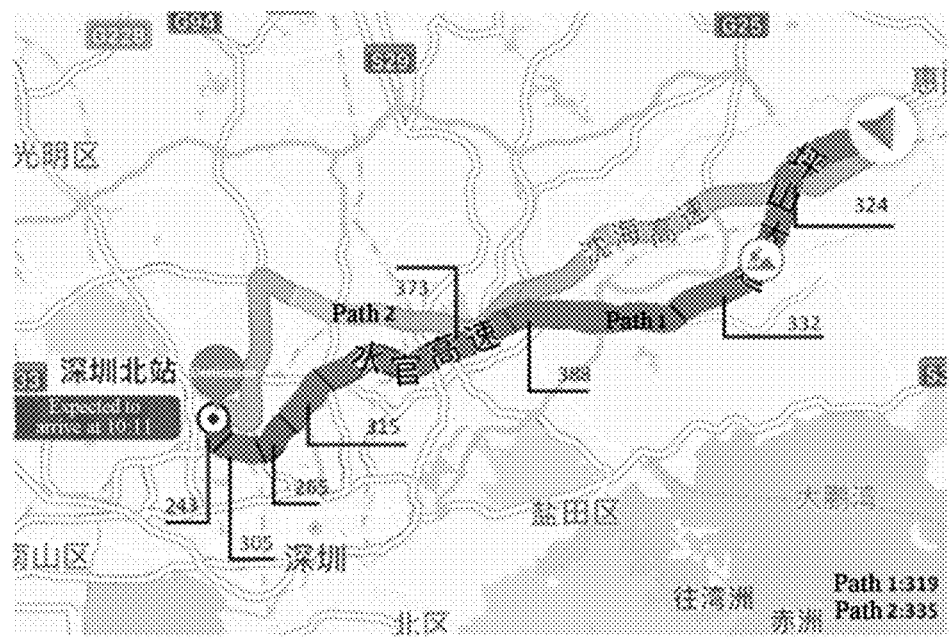
FIG. 5 is a schematic diagram of a candidate path provided in an embodiment of the present disclosure.

If there are multiple candidate paths, the first total energy consumption value required to be consumed by the target vehicle to travel on each candidate path in the multiple candidate paths can be determined according to the first energy consumption information, to obtain multiple first total energy consumption values; and the candidate path corresponding to the minimum of the multiple first total energy consumption values is determined to be a target candidate path, and the target candidate path is recommended to the target vehicle. Here, one candidate path corresponds to one first total energy consumption value. The first total energy consumption value can be the sum of the first energy consumption values required to be consumed to travel on the candidate path over every unit distance. Alternatively, the average first energy consumption value required to be consumed by the target vehicle to travel on each candidate path in the multiple candidate paths can be determined according to the first energy consumption information, to obtain multiple average first energy consumption values, the candidate path corresponding to the minimum of the multiple first total energy consumption values is determined to be a target candidate path, and the target candidate path is recommended to the target vehicle. The average first energy consumption value is the average energy consumption per unit kilometer. FIG. 5 is a schematic diagram of a candidate path provided in an embodiment of the present disclosure. In FIG. 5, the current position information and destination position information of the target vehicle, a candidate path 1 and a candidate path 2, and the first energy consumption value corresponding to each road section in each candidate path are included. The average energy consumption per unit kilometer corresponding to each candidate path may also be included, for example, the average energy consumption per unit kilometer corresponding to the candidate path 1 is 319 Wh/km, and the average energy consumption per unit kilometer corresponding to the candidate path 2 is 335 Wh/km. Then the candidate path 1 is determined to be the target candidate path, and the candidate path 1 is recommended to the target vehicle.

Optionally, the third energy consumption value corresponding to the reference vehicle on the candidate path can be directly obtained, and the candidate path is recommended to the target vehicle according to the candidate path and the third energy consumption value corresponding to the candidate path.

According to the embodiments of the present disclosure, current position information and destination position information of a target vehicle are obtained; a candidate path of the target vehicle is determined according to the current position information and the destination position information; road condition information of the candidate path and reference vehicle information are acquired; first energy consumption information required to be consumed by the target vehicle to travel on the candidate path over a unit distance is determined according to the road condition information and reference vehicle information; and the candidate path is recommended to the target vehicle according to the first energy consumption information. Here, the reference vehicle information is determined according to the energy consumption information required to be consumed when at least one reference vehicle travels on the candidate path over a unit distance in a historical period of time (that is, a time period before recommending the candidate path to the target vehicle). Since the energy consumption information is obtained in the practical travel process of the reference vehicle, the energy consumption information can accurately reflect the energy consumption value required by a vehicle travelling on the candidate path. By determining the energy consumption value corresponding to each candidate path, it is convenient for users to make a reasonable choice, to avoid the problem of insufficient energy consumption during the driving process of the vehicle, so as to optimize the recommended driving path for the vehicle and improve the driving efficiency of the vehicle.

Figure 6:
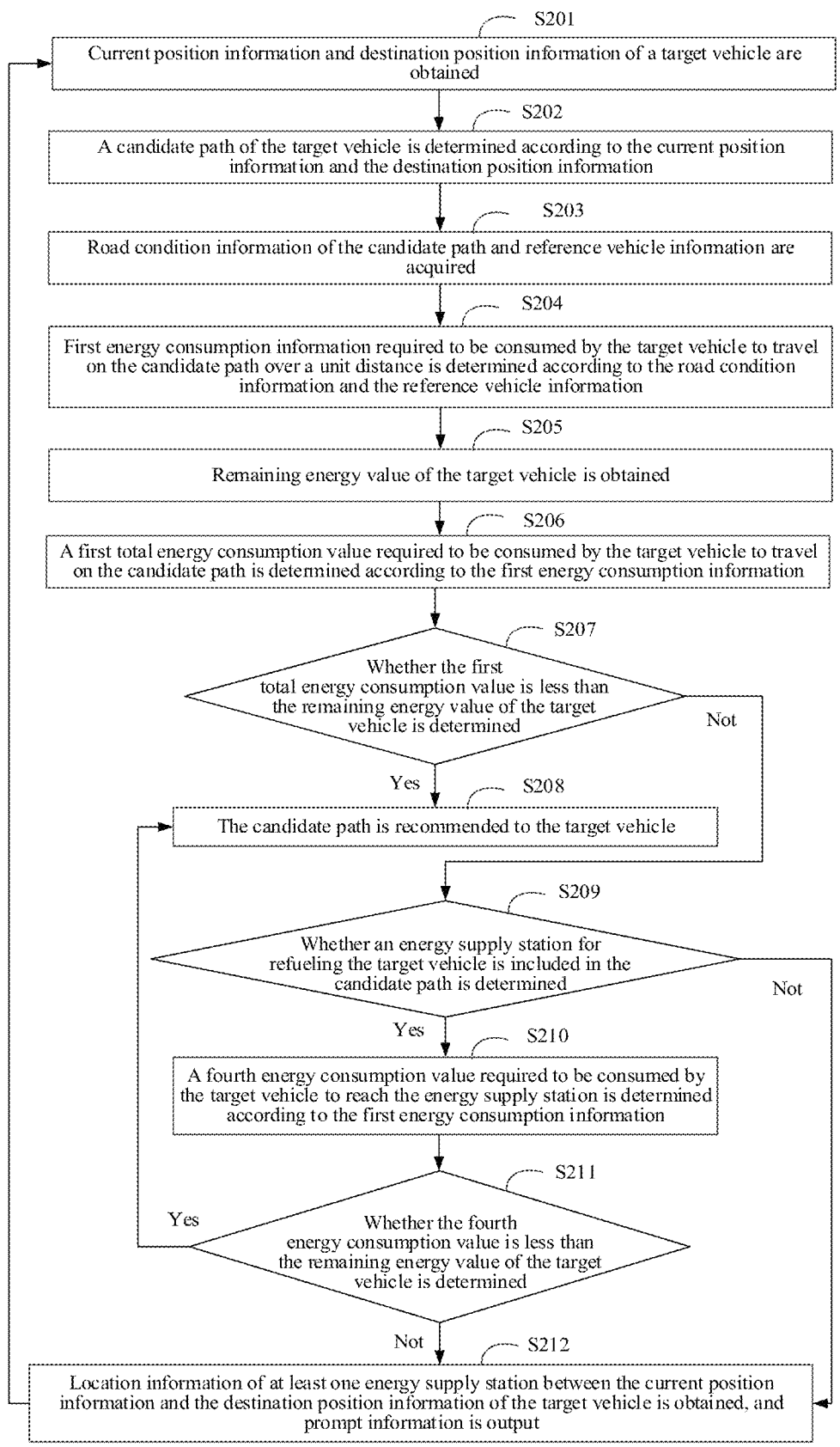
FIG. 6 is a schematic flowchart of a path determination method provided in an embodiment of the present disclosure.

Optionally, FIG. 6 is a schematic flowchart of a path determination method provided in an embodiment of the present disclosure. As shown in FIG. 6, the method includes:

S201: Current position information and destination position information of a target vehicle are obtained.

S202: A candidate path of the target vehicle is determined according to the current position information and the destination position information.

S203: Road condition information of the candidate path and reference vehicle information are acquired.

S204: First energy consumption information required to be consumed by the target vehicle to travel on the candidate path over a unit distance is determined according to the road condition information and the reference vehicle information.

Here, the specific implementation of Steps S201 to S204 can be made reference to the description of Steps S101 to S104 in the corresponding embodiment in FIG. 2, which will not be described here.

S205: Remaining energy value of the target vehicle is obtained.

Here, the target vehicle can send the current time and the remaining energy corresponding to the current time to the on-board server.

S206: A first total energy consumption value required to be consumed by the target vehicle to travel on the candidate path is determined according to the first energy consumption information.

Here, the first energy consumption information required to be consumed by the target vehicle to travel on the candidate path over a unit distance includes the first total energy consumption value required to be consumed by the target vehicle to travel on each road section in the candidate path over every unit distance, that is, the sum of the first energy consumption values required to be consumed by the target vehicle to travel on each road section in the candidate path over every unit distance.

For example, the candidate path includes two road sections, that is, road section 1 and road section 2, respectively. The energy consumption over the three unit distances corresponding to road section 1 is y1, y2 and y3, respectively. The energy consumption over the two unit distances corresponding to road section 2 is z1, and z2 respectively. The first total energy consumption value required to be consumed by the target vehicle to travel on the candidate path can be the sum y1+y2+y3+z1+z2 of the first energy consumption values required to be consumed by the target vehicle to travel on each road section in the candidate path over every unit distance.

S207: Whether the first total energy consumption value is less than the remaining energy value of the target vehicle is determined.

If so, Step S208 is performed, and if not, Step S209 is performed. Here, the first total energy consumption value required to be consumed by the target vehicle to travel on the candidate path is compared with the remaining energy value of the target vehicle, to determine whether the first total energy consumption value required to be consumed by the target vehicle to travel on the candidate path is smaller than the remaining energy value of the target vehicle.

S208: The candidate path is recommended to the target vehicle.

Here, if the first total energy consumption value required to be consumed by the target vehicle to travel on the candidate path is less than the remaining energy value of the target vehicle, it indicates that the target vehicle can travel from the current position of the target vehicle to the destination position down the candidate path on the basis of the current remaining energy value. That is, the current remaining energy value of the target vehicle is sufficient for the target vehicle to travel to the destination position. If the first total energy consumption value required to be consumed by the target vehicle to travel on the candidate path is greater than or equal to the remaining energy value of the target vehicle, it indicates that the target vehicle cannot travel from the current position of the target vehicle to the destination position down the candidate path on the basis of the current remaining energy value. That is, the current remaining energy value of the target vehicle is not sufficient for the target vehicle to travel to the destination position.

S209: Whether an energy supply station for refueling the target vehicle is included in the candidate path is determined.

If so, Step S210 is performed, and if not, Step S212 is performed. Here, the energy supply station can be a charging pile, or a charging station, a petrol station, a gas station, and so on. In a specific implementation, the type of the energy supply station can be determined according to the energy type required by the target vehicle. For example, if the target vehicle is an electric vehicle, the energy supply station can be a charging station, or charging pile, etc. If the current remaining energy value of the target vehicle is not sufficient for the target vehicle to travel to the destination position, it means that the target vehicle needs to be refueled in the process of travelling on the candidate path, so as to travel to the destination position.

S210: A fourth energy consumption value required to be consumed by the target vehicle to reach the energy supply station is determined according to the first energy consumption information.

S211: Whether the fourth energy consumption value is less than the remaining energy value of the target vehicle is determined.

If so, Step S208 is performed, and if not, Step S212 is performed. The fourth energy consumption value is compared with the remaining energy value of the target vehicle, to determine whether the fourth energy consumption value is less than the remaining energy value of the target vehicle.

Here, the fourth energy consumption value is the total energy consumption per unit kilometer required to be consumed by the target vehicle to travel on the candidate path from the current position to the energy supply station. If the fourth energy consumption value is less than the remaining value of the target vehicle, it indicates that the remaining energy value of the target vehicle allows the target vehicle to travel to the energy supply station. When the target vehicle is driven to the energy supply station, it can be refueled to travel to the destination position. If the fourth energy consumption value is greater than or equal to the remaining energy value of the target vehicle, it indicates that the remaining energy value of the target vehicle is not sufficient for the target vehicle to travel to the energy supply station. Therefore, the target vehicle is prone to lack of energy when travelling on the candidate path, and cannot travel further, resulting in low driving efficiency of the vehicle. Therefore, to avoid this situation, the target vehicle may be indicated to change its destination position information.

S212: Location information of at least one energy supply station between the current position information and the destination position information of the target vehicle is obtained, and prompt information is output.

Here, the prompt information is used to indicate the location information of at least one energy supply station to the target vehicle, so that the target vehicle can re-select the destination position information according to the location information of at least one energy supply station. That is, Step S201 is performed. Then, a corresponding candidate path is determined according to the current position information and the reselected destination position information of the target vehicle, the energy consumption information required to be consumed by the target vehicle to travel on the candidate path over a unit distance is determined, and the candidate path is recommended to the target vehicle according to the energy consumption information. The prompt information may be output in the form of text or voice, and may include "The current remaining energy is not sufficient to support you to drive to the destination position. Please change the destination position information according to the indicated location of the energy supply station".

Figure 7:
FIG. 7 is a schematic diagram of a candidate path provided in an embodiment of the present disclosure.

For example, when the energy consumption value required to be consumed by the target vehicle to travel on the candidate path is greater than or equal to the remaining energy value of the target vehicle, it indicates that if the target vehicle cannot travel from the current position of the target vehicle to the destination position down the candidate path on the basis of the current remaining energy value. Whether an energy supply station is included in the candidate path is determined. If it is determined that an energy supply station is included in the candidate path, the position of the energy supply station in the candidate path is marked in the energy consumption map for selection by the user. FIG. 7 is a schematic diagram of a candidate path provided in an embodiment of the present disclosure. In FIG. 7, the current position information and destination position information of the target vehicle, multiple candidate paths, the energy consumption per unit kilometer of each road section in each candidate path, and the position information of the energy supply station are included. The position of "optimal charging station" marked in FIG. 7 is the position of the energy supply station.

In an embodiment of the present disclosure, the obtained energy consumption value corresponding to the candidate path selected by the user is compared with the current energy value of the target vehicle, to determine whether the remaining energy value of the vehicle allows the travelling over the candidate path. If so, the candidate path is recommended to the target vehicle. If not, whether there is an energy supply station in the candidate path is determined. If so, whether the current remaining energy value of the target vehicle allows it to travel to the energy supply station is determined. If so, the candidate path is recommended to the target vehicle. If not, prompt information is output to indicate the user to change the destination position according to the location information of the energy supply station, so as to avoid the failure to travel over the candidate path or drive to the energy supply station due to insufficient remaining energy of the vehicle, affecting the driving efficiency of the vehicle. In this way, the user is facilitated to make a reasonable choice, to optimize the vehicle driving path and improve the vehicle driving efficiency.

The method according to the embodiments of the present disclosure is described above, and the apparatus according to the embodiments of the present disclosure embodiment will be described below.

Figure 8:
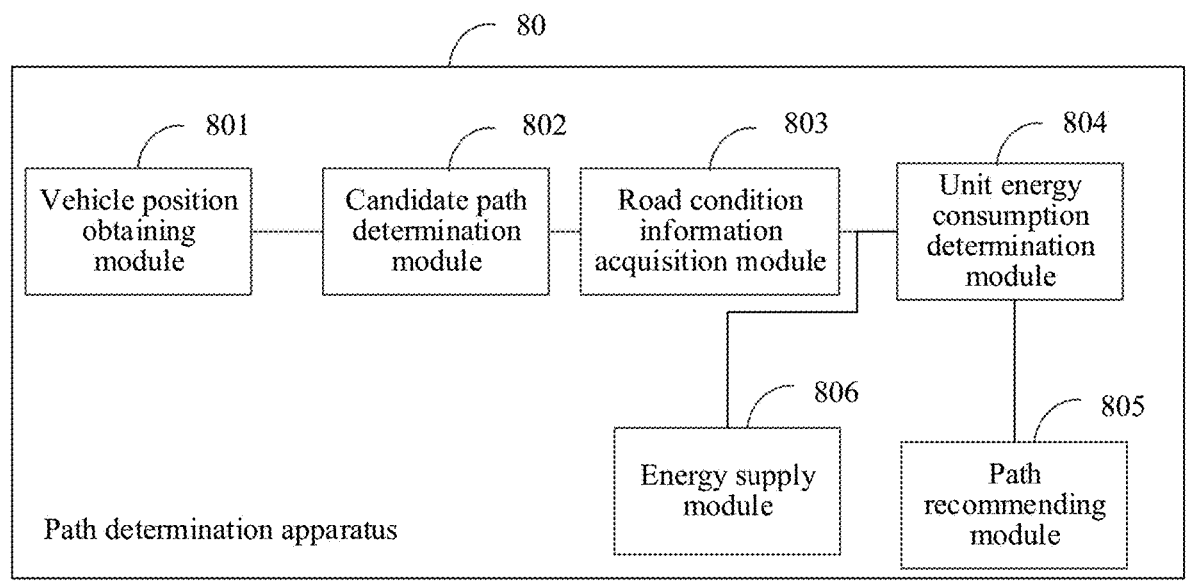
FIG. 8 is a schematic structural diagram of a path determination apparatus provided in an embodiment of the present disclosure.

FIG. 8 is a schematic structural diagram of a path determination apparatus provided in an embodiment of the present disclosure. The path determination apparatus may be a computer program (including program codes) running on a computer device, for example, the path determination apparatus is application software. The apparatus is configured to perform corresponding steps in the method provided in the embodiments of the present disclosure. Specifically, an apparatus 80 includes:

a vehicle position obtaining module 801, configured to obtain current position information and destination position information of a target vehicle;

a candidate path determination module 802, configured to determine a candidate path of the target vehicle according to the current position information and the destination position information;

a road condition information acquisition module 803, configured to acquire road condition information of the candidate path and reference vehicle information;

a unit energy consumption determination module 804, configured to determine first energy consumption information required to be consumed by the target vehicle to travel on the candidate path over a unit distance according to the road condition information and the reference vehicle information; and a path recommending module 805, configured to recommend the candidate path to the target vehicle according to the first energy consumption information.

Optionally, the candidate path includes at least one road section, the road condition information of the road section includes at least one of road section type of the road section, congestion rate of the road section, length of the road section, and number of traffic indicators in the road section; the reference vehicle information includes second energy consumption information of a reference vehicle travelling on the road section and type of the reference vehicle, and the first energy consumption information includes a first energy consumption value required to be consumed by the target vehicle to travel on the road section over a unit distance.

Optionally, the unit energy consumption determination module 804 is specifically configured to:

determine a second energy consumption value of the reference vehicle travelling on the road section over a unit distance according to the road condition information of the road section and the second energy consumption information of the reference vehicle travelling on the road section;

determine an energy consumption weight of the reference vehicle according to the type of the reference vehicle;

normalize the second energy consumption value using the energy consumption weight, to obtain a third energy consumption value of the reference vehicle travelling on the road section over a unit distance; and determine the first energy consumption value according to the third energy consumption value corresponding to the road section.

Optionally, the unit energy consumption determination module 804 is specifically configured to:

determine the total energy consumption value of the reference vehicle travelling on the road section according to the road condition information of the road section and the second energy consumption information; and obtain the second energy consumption value of the reference vehicle travelling on the road section over a unit distance according to a ratio of the total energy consumption to the length of the road section.

Optionally, multiple reference vehicles are included in the road section, and one reference vehicle corresponds to one second energy consumption value. The unit energy consumption determination module 804 is specifically configured to:

calculate an average value of the third energy consumption values corresponding to multiple reference vehicles on the road section; and determine the average value to be the first energy consumption value.

Optionally, the path recommending module 805 is specifically configured to:

obtain a travel map corresponding to the target vehicle;

mark the candidate path and the first energy consumption information on the travel map, to obtain an energy consumption map; and recommend the candidate path to the target vehicle according to the energy consumption map.

Optionally, the path recommending module 805 is specifically configured to:

obtain a remaining energy value of the target vehicle;

determine a first total energy consumption value required to be consumed by the target vehicle to travel on the candidate path according to the first energy consumption information;

compare the first total energy consumption value with the remaining energy value of the target vehicle; and recommend the candidate path to the target vehicle if the first total energy consumption value is less than the remaining energy value of the target vehicle.

Optionally, the apparatus 80 further includes: an energy supply module 806, configured to determine whether an energy supply station for refueling the target vehicle is included in the candidate path if the first total energy consumption value is greater than or equal to the remaining energy value of the target vehicle;

determine a fourth energy consumption value required to be consumed by the target vehicle to reach the energy supply station according to the first energy consumption information, if it is determined that the candidate path includes an energy supply station; and recommend the candidate path to the target vehicle if the fourth energy consumption value is less than the remaining energy value of the target vehicle.

Optionally, there are multiple candidate paths. The path recommending module 805 is specifically configured to:

determine the first total energy consumption value required to be consumed by the target vehicle to travel on each candidate path of the multiple candidate path according to the first energy consumption information, to obtain multiple first total energy consumption values, where one candidate path corresponds to one first total energy consumption value; and determine the candidate path corresponding to the minimum of the multiple first total energy consumption values to be a target candidate path, and recommending the target candidate path to the target vehicle.

It is to be understood that the disclosure not mentioned in the corresponding embodiment in FIG. 8 can be made reference to the description of the method embodiments and will not be repeated here.

According to an embodiment of the present disclosure, the steps involved in the path determination method shown in FIGS. 2 and 6 can be performed by modules in the path determination apparatus shown in FIG. 8. For example, Step S101 shown in FIG. 2 can be performed by the vehicle position obtaining module 801 in FIG. 8; Step S102 shown in FIG. 2 can be performed by the candidate path determination module 802 in FIG. 8; Step S103 shown in FIG. 2 can be performed by the road condition information acquisition module 803 in FIG. 8; Step S104 shown in FIG. 2 can be performed by the unit energy consumption determination module 804 in FIG. 8; and Step S105 shown in FIG. 2 can be performed by the path recommending module 805 in FIG. 8. According to an embodiment of the present disclosure, the modules in the path determination apparatus shown in FIG. 8 may be individually or wholly combined into one or several units, or one (or more) of the units may also be split into more functionally smaller sub-units, which can implement the same operations without affecting the technical effects of the embodiments according to the present disclosure. The above modules are divided based on logical functions. In practical application, the function of one module can also be implemented by multiple units, or the functions of multiple modules can be implemented by one unit. In other embodiments of the present disclosure, the path determination apparatus may further include other unit. In practical applications, these functions may also be implemented with the aid of other units, and implemented with the aid of multiple units.

According to another embodiment of the present disclosure, the path determination apparatus shown in FIG. 8 can be constructed and the path determination method according to the embodiment of the present disclosure can be implemented by a computer program (including program codes) that runs on a general-purpose computer device such as a computer including processing units such as a central processing unit (CPU), a random access memory (RAM), and a read-only memory (ROM), and a storage unit, and can implement the steps in the corresponding methods in FIGS. 2 and 6. The computer program may be recorded on, for example, a computer readable recording medium, loaded into and run on the computer device through the computer readable recording medium.

According to the embodiments of the present disclosure, current position information and destination position information of a target vehicle are obtained; a candidate path of the target vehicle is determined according to the current position information and the destination position information; road condition information of the candidate path and reference vehicle information are acquired; first energy consumption information required to be consumed by the target vehicle to travel on the candidate path over a unit distance is determined according to the road condition information and reference vehicle information; and the candidate path is recommended to the target vehicle according to the first energy consumption information. Here, the reference vehicle information is determined according to the energy consumption information required to be consumed when at least one reference vehicle travels on the candidate path over a unit distance in a historical period of time (that is, a time period before recommending the candidate path to the target vehicle). Since the energy consumption information is obtained in the practical travel process of the reference vehicle, the energy consumption information can accurately reflect the energy consumption value required by a vehicle travelling on the candidate path. By determining the energy consumption value corresponding to each candidate path, it is convenient for users to make a reasonable choice, to avoid the problem of insufficient energy consumption during the driving process of the vehicle, so as to optimize the recommended driving path for the vehicle and improve the driving efficiency of the vehicle.

Figure 9:
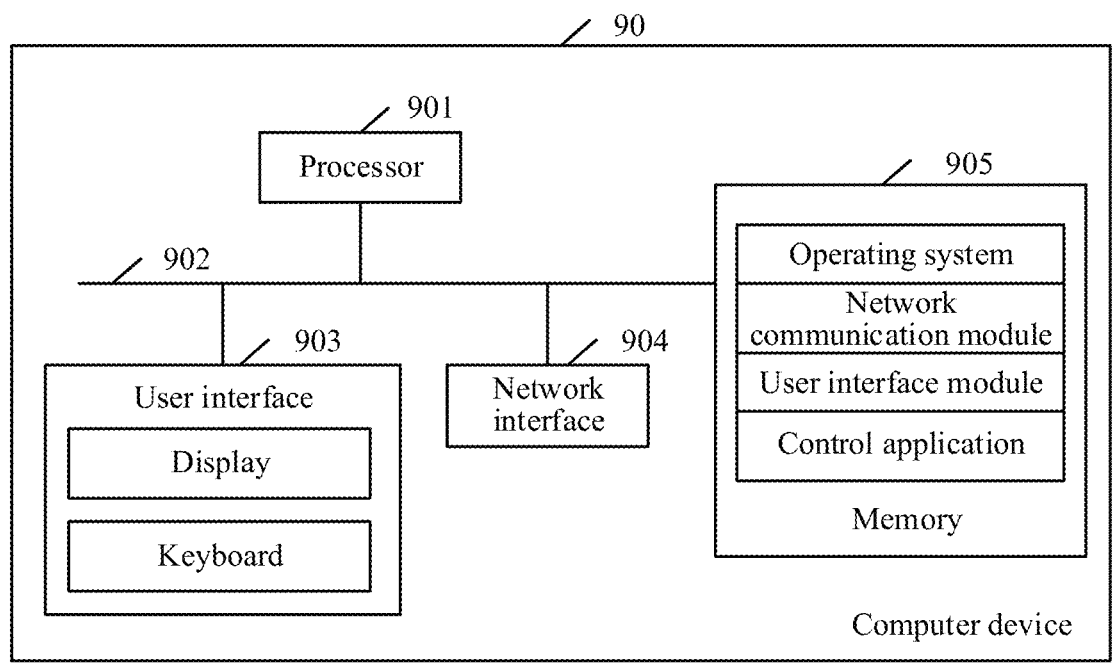
FIG. 9 is a schematic structural diagram of a computer device provided in an embodiment of the present disclosure.

FIG. 9 is a schematic structural diagram of a computer device provided in an embodiment of the present disclosure. As shown in FIG. 9, the computer device 90 may include: a processor 901, a network interface 904 and a memory 905. In addition, the computer device 90 may further include: a user interface 903, and at least one communication bus 902. The communication bus 902 is configured to enable the connection and communication between these components. The user interface 903 can include a display and a keyboard. Optionally, the user interface 903 may further include a standard wired and wireless interface. The network interface 904 may optionally include a standard wired interface and wireless interface (such as WI-FI interface). The memory 905 may be a high-speed random access memory (RAM), or a non-volatile memory, for example, at least one magnetic disk storage. The memory 905 is optionally at least one storage apparatus away from the processor 901 mentioned above. As shown in FIG. 9, the memory 905, as a computer readable storage medium, may include an operating system, a network communication module, a user interface module, and a control application.

In the computer device 90 shown in FIG. 9, the network interface 904 can provide a network communication function; and the user interface 903 is mainly used to provide an input interface for the user. The processor 901 can be configured to invoke a control application stored in the memory 905 to obtain current position information and destination position information of a target vehicle;
determine a candidate path of the target vehicle according to the current position information and the destination position information;
acquire road condition information of the candidate path and reference vehicle information;
determine first energy consumption information consumed by the target vehicle to travel on the candidate path over a unit distance according to the road condition information and the reference vehicle information; and
recommend the candidate path to the target vehicle according to the first energy consumption information.

It should be understood that the computer device 90 described in the embodiment of the present disclosure can implement the path determination methods described in the corresponding embodiments in FIGS. 2 and 4, and implement the path determination apparatus in the corresponding embodiment in FIG. 8, which will not be repeated here. In addition, the description of beneficial effects of the same method are not described herein again.

According to the embodiments of the present disclosure, current position information and destination position information of a target vehicle are obtained; a candidate path of the target vehicle is determined according to the current position information and the destination position information; road condition information of the candidate path and reference vehicle information are acquired; first energy consumption information required to be consumed by the target vehicle to travel on the candidate path over a unit distance is determined according to the road condition information and reference vehicle information; and the candidate path is recommended to the target vehicle according to the first energy consumption information. Here, the reference vehicle information is determined according to the energy consumption information required to be consumed when at least one reference vehicle travels on the candidate path over a unit distance in a historical period of time (that is, a time period before recommending the candidate path to the target vehicle). Since the energy consumption information is obtained in the practical travel process of the reference vehicle, the energy consumption information can accurately reflect the energy consumption value required by a vehicle travelling on the candidate path. By determining the energy consumption value corresponding to each candidate path, it is convenient for users to make a reasonable choice, to avoid the problem of insufficient energy consumption during the driving process of the vehicle, so as to optimize the recommended driving path for the vehicle and improve the driving efficiency of the vehicle.

An embodiment of the present disclosure further provides a computer readable storage medium storing a computer program including program instructions. When the program instructions are executed by a computer, the computer implements the method according to the above embodiments, where the computer is part of the computer device, for example, the processor 901. For example, the program instructions are deployed to execute on a computer device, deployed to execute on multiple computer devices in a single site, or deployed to execute on multiple computer devices distributed in multiple sites and interconnected through a communication network, where the multiple computer devices distributed in multiple sites and interconnected through a communication network can form a blockchain network.

In the specification, claims, and accompanying drawings of the present disclosure, the terms such as "first", "second", "third" and "fourth" are intended to distinguish between different objects rather than indicate a particular order. In addition, the terms "include", "have", and any variant thereof are intended to cover a non-exclusive inclusion. For example, a process, method, system, product, or device including a series of steps or units is not limited to the listed steps or units; and instead, further optionally includes a step or unit that is not listed, or further optionally includes another step or unit that is intrinsic to the process, method, product, or device.

It is to be understood by a person of ordinary skill in the art that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

Preferred embodiments of the present disclosure have been disclosed above; however, the scope of the claims of the present disclosure is not limited thereto. Therefore, equivalent variations made in accordance with the claims of the present disclosure shall fall within the scope of the present disclosure.

What is claimed is:

1. A path determination method, comprising:
   obtaining current position information and destination position information of a target vehicle;
   determining a candidate path of the target vehicle according to the current position information and the destination position information;
   acquiring road condition information of the candidate path and reference vehicle information corresponding to a reference vehicle travelling on the candidate path with reference time information that matches current time information of the target vehicle;
   determining first energy consumption information required to be consumed by the target vehicle to travel on the candidate path over a unit distance according to the road condition information and the reference vehicle information; and
   recommending the candidate path to the target vehicle according to the first energy consumption information.

2. The method according to claim 1, wherein:
   the candidate path comprises at least one road section,
   the road condition information of the road section comprises at least one of road section type of the road section, congestion rate of the road section, length of the road section, and number of traffic indicators in the road section,
   the reference vehicle information comprises second energy consumption information of a reference vehicle when travelling on the road section and type of the reference vehicle, and the first energy consumption information comprises a first energy consumption value required to be consumed by the target vehicle to travel on the road section over a unit distance.

3. The method according to claim 2, wherein the determining first energy consumption information required to be consumed by the target vehicle to travel on the candidate path over a unit distance according to the road condition information and the reference vehicle information comprises:
   determining a second energy consumption value of the reference vehicle when travelling on the road section over a unit distance according to the road condition information of the road section and the second energy consumption information;
   determining an energy consumption weight of the reference vehicle according to the type of the reference vehicle;
   normalizing the second energy consumption value using the energy consumption weight, to obtain a third energy consumption value corresponding to the road section; and
   determining the first energy consumption value according to the third energy consumption value.

4. The method according to claim 3, wherein a plurality of reference vehicles are comprised on the road section, and one reference vehicle corresponds to one third energy consumption value; and the determining the first energy consumption value according to the third energy consumption value comprises:
   calculating an average value of the third energy consumption values corresponding to the plurality of reference vehicles on the road section; and
   determining the average value to be the first energy consumption value.

5. The method according to claim 1, wherein the recommending the candidate path to the target vehicle according to the first energy consumption information comprises:
   obtaining a travel map corresponding to the target vehicle;
   marking the candidate path and the first energy consumption information on the travel map, to obtain an energy consumption map; and
   recommending the candidate path to the target vehicle according to the energy consumption map.

6. The method according to claim 1, wherein the recommending the candidate path to the target vehicle according to the first energy consumption information comprises:
   obtaining a remaining energy value of the target vehicle;
   determining a first total energy consumption value required to be consumed by the target vehicle to travel on the candidate path according to the first energy consumption information;
   comparing the first total energy consumption value with the remaining energy value of the target vehicle; and
   recommending the candidate path to the target vehicle if the first total energy consumption value is less than the remaining energy value of the target vehicle.

7. The method according to claim 6, further comprising:
   determining whether the candidate path comprises an energy supply station for refueling the target vehicle if the first total energy consumption value is greater than or equal to the remaining energy value of the target vehicle;
   determining a fourth energy consumption value required to be consumed by the target vehicle to reach the energy supply station according to the first energy consumption information, if it is determined that the candidate path comprises an energy supply station; and
   recommending the candidate path to the target vehicle if the fourth energy consumption value is less than the remaining energy value of the target vehicle.

8. The method according to claim 1, wherein there are a plurality of candidate paths; and the recommending the candidate path to the target vehicle according to the first energy consumption information comprises:
   determining the first total energy consumption value required to be consumed by the target vehicle to travel on each candidate path of the plurality of candidate paths according to the first energy consumption information, to obtain a plurality of first total energy consumption values, where one candidate path corresponds to one first total energy consumption value; and
   determining the candidate path corresponding to the minimum first total energy consumption value to be the target candidate path, and recommending the target candidate path to the target vehicle.

9. A computer device, comprising:
   a memory configured to store a program code;
   a network interface configured to provide a data communication function; and
   a processor connected to the memory and the network interface, wherein the processor is configured to execute the program code to perform:
obtaining current position information and destination position information of a target vehicle;
determining a candidate path of the target vehicle according to the current position information and the destination position information;
acquiring road condition information of the candidate path and reference vehicle information corresponding to a reference vehicle travelling on the candidate path with reference time information that matches current time information of the target vehicle;
determining first energy consumption information required to be consumed by the target vehicle to travel on the candidate path over a unit distance according to the road condition information and the reference vehicle information; and
recommending the candidate path to the target vehicle according to the first energy consumption information.

10. The computer device according to claim 9, wherein:
the candidate path comprises at least one road section,
the road condition information of the road section comprises at least one of road section type of the road section, congestion rate of the road section, length of the road section, and number of traffic indicators in the road section,
the reference vehicle information comprises second energy consumption information of a reference vehicle when travelling on the road section and type of the reference vehicle, and
the first energy consumption information comprises a first energy consumption value required to be consumed by the target vehicle to travel on the road section over a unit distance.

11. The computer device according to claim 10, wherein the determining first energy consumption information required to be consumed by the target vehicle to travel on the candidate path over a unit distance according to the road condition information and the reference vehicle information comprises:
determining a second energy consumption value of the reference vehicle when travelling on the road section over a unit distance according to the road condition information of the road section and the second energy consumption information;
determining an energy consumption weight of the reference vehicle according to the type of the reference vehicle;
normalizing the second energy consumption value using the energy consumption weight, to obtain a third energy consumption value corresponding to the road section; and
determining the first energy consumption value according to the third energy consumption value.

12. The computer device according to claim 11, wherein a plurality of reference vehicles are comprised on the road section, and one reference vehicle corresponds to one third energy consumption value; and the determining the first energy consumption value according to the third energy consumption value comprises:
calculating an average value of the third energy consumption values corresponding to the plurality of reference vehicles on the road section; and
determining the average value to be the first energy consumption value.

13. The computer device according to claim 9, wherein the recommending the candidate path to the target vehicle according to the first energy consumption information comprises:
obtaining a travel map corresponding to the target vehicle;
marking the candidate path and the first energy consumption information on the travel map, to obtain an energy consumption map; and
recommending the candidate path to the target vehicle according to the energy consumption map.

14. The computer device according to claim 9, wherein the recommending the candidate path to the target vehicle according to the first energy consumption information comprises:
obtaining a remaining energy value of the target vehicle;
determining a first total energy consumption value required to be consumed by the target vehicle to travel on the candidate path according to the first energy consumption information;
comparing the first total energy consumption value with the remaining energy value of the target vehicle; and
recommending the candidate path to the target vehicle if the first total energy consumption value is less than the remaining energy value of the target vehicle.

15. The computer device according to claim 14, wherein the processor is further configured to perform:
determining whether the candidate path comprises an energy supply station for refueling the target vehicle if the first total energy consumption value is greater than or equal to the remaining energy value of the target vehicle;
determining a fourth energy consumption value required to be consumed by the target vehicle to reach the energy supply station according to the first energy consumption information, if it is determined that the candidate path comprises an energy supply station; and
recommending the candidate path to the target vehicle if the fourth energy consumption value is less than the remaining energy value of the target vehicle.

16. The computer device according to claim 9, wherein there are a plurality of candidate paths; and the recommending the candidate path to the target vehicle according to the first energy consumption information comprises:
determining the first total energy consumption value required to be consumed by the target vehicle to travel on each candidate path of the plurality of candidate paths according to the first energy consumption information, to obtain a plurality of first total energy consumption values, where one candidate path corresponds to one first total energy consumption value; and
determining the candidate path corresponding to the minimum first total energy consumption value to be the target candidate path, and recommending the target candidate path to the target vehicle.

17. A non-transitory computer-readable storage medium storing computer program instructions executable by a processor to perform:
obtaining current position information and destination position information of a target vehicle;
determining a candidate path of the target vehicle according to the current position information and the destination position information;
acquiring road condition information of the candidate path and reference vehicle information corresponding to a reference vehicle travelling on the candidate path with reference time information that matches current time information of the target vehicle;

determining first energy consumption information required to be consumed by the target vehicle to travel on the candidate path over a unit distance according to the road condition information and the reference vehicle information; and recommending the candidate path to the target vehicle according to the first energy consumption information.

18. The non-transitory computer-readable storage medium according to claim 17, wherein:

the candidate path comprises at least one road section, the road condition information of the road section comprises at least one of road section type of the road section, congestion rate of the road section, length of the road section, and number of traffic indicators in the road section, the reference vehicle information comprises second energy consumption information of a reference vehicle when travelling on the road section and type of the reference vehicle, and the first energy consumption information comprises a first energy consumption value required to be consumed by the target vehicle to travel on the road section over a unit distance.

19. The method according to claim 18, wherein the determining first energy consumption information required to be consumed by the target vehicle to travel on the candidate path over a unit distance according to the road condition information and the reference vehicle information comprises:

determining a second energy consumption value of the reference vehicle when travelling on the road section over a unit distance according to the road condition information of the road section and the second energy consumption information;

determining an energy consumption weight of the reference vehicle according to the type of the reference vehicle;

normalizing the second energy consumption value using the energy consumption weight, to obtain a third energy consumption value corresponding to the road section; and determining the first energy consumption value according to the third energy consumption value.

20. The non-transitory computer-readable storage medium according to claim 19, wherein a plurality of reference vehicles are comprised on the road section, and one reference vehicle corresponds to one third energy consumption value; and the determining the first energy consumption value according to the third energy consumption value comprises:

calculating an average value of the third energy consumption values corresponding to the plurality of reference vehicles on the road section; and determining the average value to be the first energy consumption value.

\* \* \* \* \*